United States Patent [19]

Cherian et al.

[11] Patent Number: 5,331,832
[45] Date of Patent: Jul. 26, 1994

[54] SLEEVE SIZING PROCESSES

[75] Inventors: Abraham Cherian, Webster; William G. Herbert, Jr., Williamson, both of N.Y.

[73] Assignee: Xerox Corporation, Stamford, Conn.

[21] Appl. No.: 110,748

[22] Filed: Aug. 23, 1993

[51] Int. Cl.$^5$ .............................................. B21D 26/14
[52] U.S. Cl. .................................................. 72/56; 72/430
[58] Field of Search ........................... 72/56, 62, 430

[56] References Cited

U.S. PATENT DOCUMENTS

| | | | |
|---|---|---|---|
| 2,976,907 | 3/1961 | Harvey et al. | 153/10 |
| 3,187,532 | 6/1965 | Furth | 72/430 |
| 3,288,006 | 11/1966 | Erlandson | 72/56 |
| 3,345,732 | 10/1967 | Brower | 72/56 |
| 3,372,566 | 3/1968 | Schenk et al. | 72/56 |
| 3,383,890 | 5/1968 | Wildi | 72/56 |
| 3,618,350 | 11/1971 | Larrimer, Jr. | 72/56 |
| 3,810,372 | 5/1974 | Queyroix | 72/56 |
| 4,265,990 | 5/1981 | Stolka et al. | 430/59 |
| 4,619,127 | 10/1986 | Sano et al. | 72/56 |
| 4,947,667 | 8/1990 | Gunkel et al. | 72/56 |

OTHER PUBLICATIONS

"Contoured Tubing Transitions Made With Magneform ©", Maxwell Laboratories, Product Bulletin MLB-2013A.

"Advantages of Magneform © Over Conventional Assembly Methods", Maxwell Laboratories, Product Bulletin MLB-2003A.

Magneform ©-Metal Forming With Magnetic Force, Maxwell Laboratories, Product Bulletin MLB-2044A.

Maxwell Laboratories Magneform 7000 Series Bulletin 1202A.

Maxwell Laboratories Bulletin 1201R (1976).

Rubber Boot Banded onto Automotive Ball-Joint by Magneform © Method, Maxwell Laboratories Product Bulletin MLB-2008A.

*Primary Examiner*—David Jones
*Attorney, Agent, or Firm*—Zosan S. Soong

[57] ABSTRACT

A method and apparatus are disclosed for sizing preferably small diameter sleeves, wherein the method comprises the steps in any effective order of: (a) providing an electrically conductive sleeve and a die; (b) positioning a portion of the sleeve in the die; (c) positioning a portion of an electrically conductive member inside the sleeve; (d) forming a direct electrical connection between the sleeve and the member; and (e) creating a magnetic field to expand the sleeve.

18 Claims, 1 Drawing Sheet

SLEEVE SIZING PROCESSES

BACKGROUND OF THE INVENTION

The invention relates generally to methods of sizing metal sleeves, and particularly relates to a method of sizing small outside diameter metal sleeves using a magnetic field. These sleeves can be utilized as substrates for imaging members such as layered photoreceptors, reference Stolka et al., U.S. Pat. No. 4,265,990, the disclosure of which is totally incorporated by reference.

The process of sizing metal sleeves generally includes expanding the metal sleeve, or at least a portion thereof, to a desired finished size and shape. Several methods of sizing metal sleeves are known in the art. One known method provides for the insertion of a mandrel into the metal sleeve. An inner surface of the metal sleeve is generally coated with a lubricant and the mandrel contacts the inner surface to expand the metal sleeve to a desired size. Another method, known as hydroforming, uses hydraulic pressure to expand the metal sleeve. Fluid is passed through the metal sleeve and contacts the inner surface. The resulting pressure is controlled to expand the metal sleeve to a desired size.

In another known method of metal forming, generally referred to as magnaforming, there is generated a magnetic field to exert pressure on the sleeve. This method generally requires the use of sleeves composed of electrically conductive material. The conductive sleeves are placed in a split die with a magnetic coil. The magnetic coil generates a magnetic field which induces current in the conductive sleeve, thereby creating an opposing magnetic field. The net magnetic force between the two opposing magnetic fields exerts substantial pressure on the sleeve to expand the sleeve against an inner surface of the die. This process is disclosed in U.S. Pat. No. 2,976,907, to Harvey et al., the disclosure of which is totally incorporated herein by reference. In particular, Harvey et al. discloses a metal conductor bent back upon itself in hairpin fashion which is positioned inside the sleeve.

Several applications require the sized metal sleeves to have precise and uniform dimensions, and highly polished outer surfaces. For example, components used in xerographic apparatus, such as photoreceptor substrates, must be uniformly sized and have highly polished outer surfaces to ensure that a toner powder image formed on the photoreceptor substrate is accurately transferred to a copy sheet to clearly depict an image of the original document.

It is believed that the aforementioned methods do not consistently produce sized sleeves having uniform dimensions and highly polished outer surfaces. The hydroforming and mandrel methods, which require physical contact with the inner surface of the sleeve, do not consistently produce sized sleeves having precise and uniform dimensions. Additionally, these methods may also damage the inner surface of the sleeve due to the requirement of physical contact. The method of sizing using a split die and magnetic coil can generally produce sized sleeves having more precise and uniform dimensions than those requiring physical contact with the sleeve. However, magnaforming employing conventional expansion coils, comprised of metal coils wound on an insulating material, is impractical for small diameter tubes, especially those with thin walls, as there is insufficient room to satisfy clearance for cooling and to prevent electrical arcing, i.e., short circuits.

In co-pending Cherian et al., U.S. Ser. No. 07/990,852, filed Dec. 14, 1992, the disclosure of which is totally incorporated by reference, there is disclosed a method of sizing a sleeve of electrically conductive material, the sleeve having inner and outer surfaces, comprising the steps of: inserting the sleeve in a die having an inner surface; positioning a magnetic field generating means inside the sleeve in the die; sealing the die after the insertion of the sleeve and the positioning of the magnetic field generating means; creating a vacuum inside the die to avoid air pockets between the outer surface of the sleeve and the inner surface of the die; and energizing the magnetic field generating means to create a magnetic field to expand the sleeve against the inner surface of the die.

In co-pending Cherian et al., U.S. Ser. No. 08/043,888, filed Apr. 7, 1993, the disclosure of which is totally incorporated by reference, there is disclosed a method for the removal of layered material from a photoreceptor comprising an electrically conductive substrate, wherein the method comprises: employing a magnetic field to expand or shrink the width of at least a portion of the substrate, whereby a portion of the layered material over the expanded or shrunken portion of the substrate becomes loosened from the photoreceptor.

SUMMARY OF THE INVENTION

Accordingly, it is an object of the present invention to provide a method for sizing a metal sleeve to obtain a substantially precisely formed and dimensioned finished product.

It is another object of the invention to provide a magnaforming method for sizing a metal sleeve which provides a highly polished outer surface.

It is a further object to provide a method for sizing a metal sleeve which does not require physical contact with the inner surface of the metal sleeve.

It is another object of the present invention to provide a method for sizing small outside diameter metal sleeves, especially those with thin walls.

These objects and others are met in embodiments by providing a metal sizing method comprising: (a) providing an electrically conductive sleeve and a die; (b) positioning a portion of the sleeve in the die; (c) positioning a portion of an electrically conductive member inside the sleeve; (d) forming a direct electrical connection between the sleeve and the member; and (e) creating a magnetic field to expand the sleeve. The steps may be in any effective order including from (a) to (e) in sequential order. In embodiments, steps (c) and (d) may occur substantially simultaneously since a direct electrical connection may be formed between the sleeve and the conductive member when the conductive member is positioned inside the sleeve.

In embodiments, there is also provided a metal sizing apparatus comprising: (a) a die; (b) a portion of an electrically conductive sleeve disposed in the die; (c) a portion of an electrically conductive member disposed in the sleeve; and (d) connecting means for providing a direct electrical connection between the sleeve and the member, wherein the connecting means is coupled to the member and the connecting means is in direct electrical contact with the sleeve.

BRIEF DESCRIPTION OF THE DRAWING

Other aspects of the present invention will become apparent as the following description proceeds and upon reference to FIG. 1 which represents a top cross-sectional view of preferred components used in the present invention.

DETAILED DESCRIPTION

Figure 1:
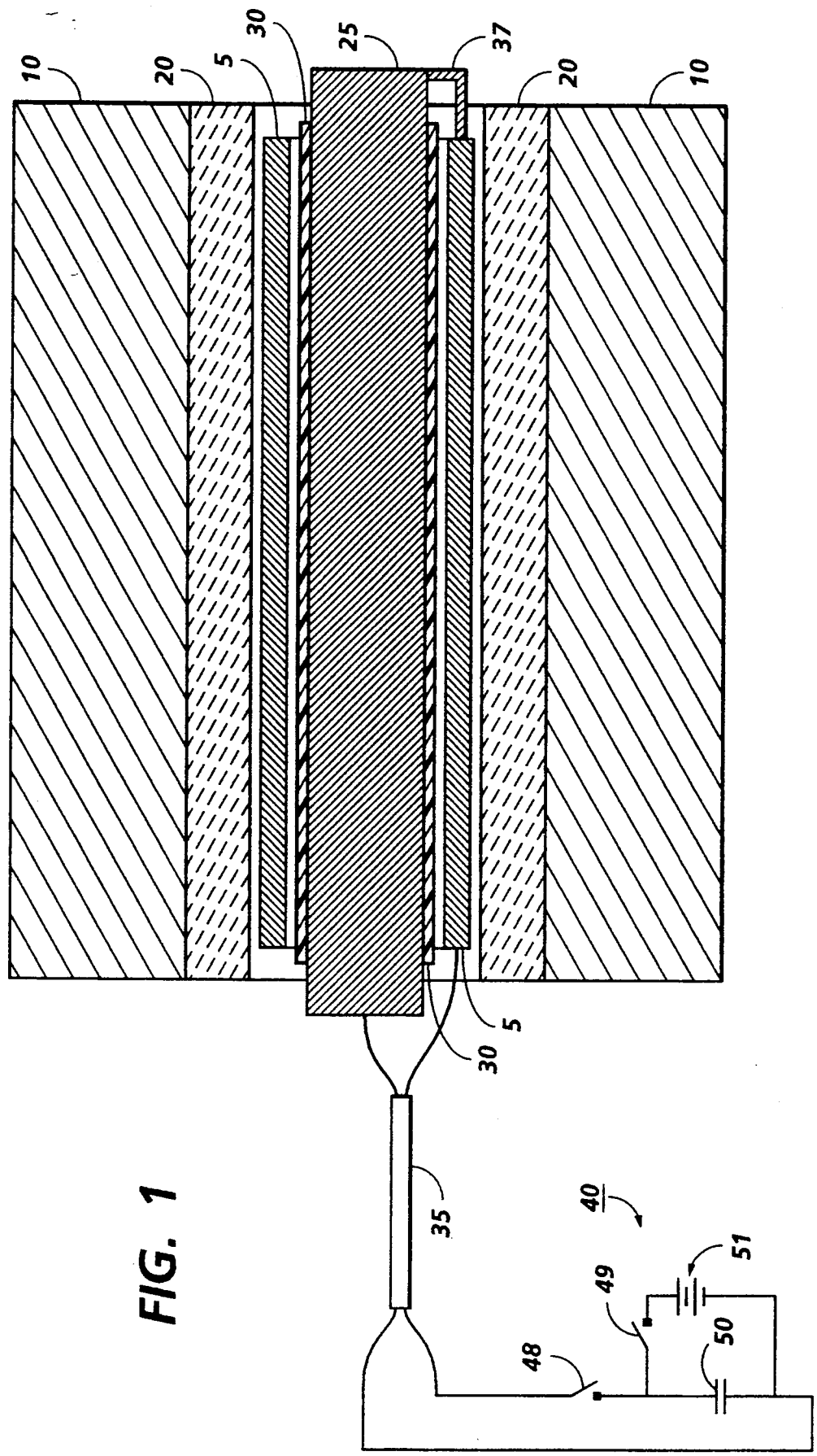

Referring to FIG. 1, sleeve 5 is sized in die 10 which controls the outer dimensions of the sleeve. The inner surface of the die has thereon a layer of electrically insulating material 20, which optionally may be knurled or grooved depending on the intended application of the sleeve. Electrically conductive member 25, having a layer electrically insulating material 30 thereon, is positioned within sleeve 5 with a gap separating insulating layer 30 and sleeve 5. Metal member 25 and sleeve 5 are connected through coaxial cable 35 to pulsing network 40. Metal member 25 is in direct electrical connection with sleeve 5 through an electrically conductive interconnection piece 37. The end of sleeve 5 is in contact with the end of interconnection piece 37. When switch 49 is closed and switch 48 is open, high voltage capacitor 50 is charged by voltage supply 51. Capacitor 50 is then discharged by opening switch 49 and closing switch 48 to supply an electric current to metal member 25 through cable 35. The current running through metal member 25 and sleeve 5 results in a magnetic force which generates a substantially uniform pressure which is applied to the inner surface of the sleeve to expand the metal sleeve outwardly against insulating layer 20 of die 10. In embodiments of the present invention, sleeve 5 and member 25 function like a single turn magnetic coil.

The sleeve and the conductive member disposed therein are in direct electrical connection by any suitable method and apparatus. In embodiments, an electrically conductive interconnection piece is coupled to the conductive member by for example welding or by a C-clamp. The interconnection piece may be positioned to contact preferably the end of the sleeve. In embodiments, the interconnection piece may be a metal component shaped into a right angle such that one end is coupled to the conductive member and the other end contacts the sleeve. Preferably, the interconnection piece is fabricated from a metal such as nickel, copper, stainless steel, iron, or aluminum.

The term sleeve refers to an at least partially hollow, preferably completely hollow, component with an opening at one or both ends which allows insertion of the metal member. The sleeve may be of any suitable shape, preferably cylindrical, but need not be cylindrical and may have bends or contours depending on the application in which the sleeve is to be sized. In embodiments, the sleeve is the substrate portion of a photoconductive or photosensitive imaging member, where the sleeve is bare, i.e., uncoated, or is coated with one or more layers typically used in photoreceptors. The sleeve ("substrate") can be formulated entirely of an electrically conductive material, or it can be an insulating material having an electrically conductive surface. The substrate can be opaque or substantially transparent and can comprise numerous suitable materials having the desired mechanical properties. The entire substrate can comprise the same material as that in the electrically conductive surface or the electrically conductive surface can be a coating on the substrate. Any suitable electrically conductive material can be employed. Typical electrically conductive materials include metals like copper, brass, nickel, zinc, chromium stainless or low-carbon steel; conductive plastics and rubbers; aluminum, semitransparent aluminum, steel, cadmium, titanium, silver, gold, paper rendered conductive by the inclusion of a suitable material such as carbon black therein or through conditioning in a humid atmosphere greater than for example 50% relative humidity to ensure the presence of sufficient water content to render the material conductive, indium, tin, metal oxides, including tin oxide and indium tin oxide, and the like. The substrate can be of any other conventional material, including organic and inorganic materials. Typical substrate materials include insulating non-conducting materials such as various resins known for this purpose including polycarbonates, polyamides, polyurethanes, paper, glass, plastic, polyesters such as MYLAR ® (available from DuPont) or MELINEX 447 ® (available from ICI Americas, Inc.), and the like. The conductive substrate can be coated by for example bar coating onto an insulating material. In addition, the substrate can comprise a metallized plastic, such as titanized or aluminized MYLAR ®.

The sleeve can have any appropriate wall thickness. When the sleeve is fabricated entirely of an electrically conductive material, the wall thickness may be for example less than about 0.10 inch, preferably less than about 0.050 inch, and more preferably from about 0.0010 to about 0.020 inch. When the sleeve comprises a conductive coating on an insulating material, the conductive coating may be of any appropriate thickness, preferably from about 0.0010 to about 0.10 inch, and more preferably from about 0.020 to about 0.050 inch; and the insulating material may be of any appropriate thickness, preferably from about 0.0010 to about 0.10 inch, and more preferably from about 0.020 to about 0.050 inch.

Although the present invention can be used to size sleeves of any suitable dimensions, it is preferred to size small outside diameter sleeves, especially those with thin walls. Small outside diameter ("OD") sleeves refer for example to sleeves having the following dimensions before sizing: OD of less than about 3 inches, preferably from about 0.5 inch to about 1.5 inches; wall thickness of less than about 0.10 inch, preferably less than about 0.050 inch, and more preferably from about 0.0010 to about 0.020 inch; and inside diameter of less than about 3 inches, and preferably from about 0.5 inch to about 1.5 inches. The processes of the present invention can permit in embodiments an increase in the diameter of the sleeve by any suitable amount, preferably from about 0.2 to about 3 inches, and more preferably from about 0.5 to about 1.5 inches.

A portion such as from about 50 to about 90% the length of the sleeve, and preferably the entire length of the sleeve, is inserted into a die having an inner surface at least partially covered by an electrically insulating layer wherein the extent of coverage of the insulating layer over the die inner surface and the thickness of the insulating layer are effective to prevent electrical shorting between the sleeve and the die. In embodiments, the insulating layer covers the entire die inner surface, a substantial portion thereof or only that portion which corresponds to the inserted length of the metal conductive member. The die insulating layer may be of any thickness effective to prevent electrical short circuiting, preferably at least about 40 mils thick, and more preferably from about 40 mils to about 1.5 inches thick. The insulating layer may be comprised of any suitable electrically insulating material such as ceramic, glass, and Teflon TM. The insulating layer may be an integral part of the die or it may be a separate detachable lining. To prepare an insulating layer which is integral with the die, the die surface may be coated with the insulating layer in a process similar to the methods for preparing glass or ceramic lined chemical process tanks. The insulating layer may be prepared for example by depositing onto the die surface a composition comprised of the insulating material such as glass dispersed in a liquid carrier and then heating until the carrier evaporates and the glass flows. Other suitable ways to prepare the insulating layer on the die include plasma spraying and electrodeposition. In embodiments, the surface of the insulating layer facing the sleeve is knurled or grooved so that the sized sleeve will incorporate the pattern onto its outer surface.

Any suitable die may be employed including the seamless type or the split die type. Split dies are preferred since sized sleeves are easier to remove from a split die than a seamless die. For photoreceptor applications, the die may be of any suitable material such as steel and the die may be cylindrical.

At least a portion of a metal conductive member is positioned inside the sleeve either before or after insertion of the sleeve into the die, wherein there is maintained a separation between the metal member and the inner surface of the sleeve of an effective distance to prevent electrical shorting therebetween. In embodiments, the metal member is first positioned inside the sleeve and then the sleeve with the metal member therein is positioned within the die. In alternative embodiments, the sleeve is first positioned in the die, and then the metal member is positioned in the sleeve.

The metal member may be of any effective size or shape having for example a cylindrical, a semi-cylindrical, a rectangular, or a square cross-section. A metal conductor bent back upon itself in hairpin fashion, such as that disclosed in Harvey et al., U.S. Pat. No. 2,976,907, may be also employed. Preferably, the metal member is a hollow or a solid cylindrical rod which is of a size effective for its insertion into the sleeve, wherein the metal member preferably has an outside diameter of less than about 3 inches, and more preferably from about 0.5 inch to about 1.5 inches. The metal member is fabricated from a suitable conductive metal comprising for example copper, aluminum, low-carbon steel, or brass.

In embodiments, the separation between the metal member and the inner surface of the sleeve is effected by a gap, a layer of an electrically insulating material, or both the gap and the insulating layer. It is understood that in embodiments the insulating layer on the metal member may contact the inner surface of the sleeve. The gap and/or the insulating layer may be of any appropriate thickness for preventing electrical shorting between the metal member and the sleeve, preferably at least about 40 mils, more preferably from about 40 mils to about 1.5 inches. It is understood that the separation is maintained for an effective segment of the sleeve, preferably the entire length thereof. In embodiments, the insulating layer covers at least the portion of the metal member positioned inside the sleeve, and preferably the entire length of the metal member. The insulating layer may be comprised of any suitable electrically insulating material including the non-conductive materials described herein such as ceramic, glass, and Teflon TM. The insulating layer may be an intergral part of the metal member or an integral part of the inner surface of the sleeve. In embodiments, the insulating layer is a detachable lining which can be reused. In those embodiments, where the separation is effected by a gap alone, there is employed any suitable apparatus for ensuring that the metal member maintains the desired separation from the inner surface of the sleeve. For example, in embodiments where the metal member is longer than the sleeve, the end of the metal member which extends beyond the sleeve may be rigidly held in place by a clamping or gripping device which in turns is fixedly positioned.

The metal member is energized to create a magnetic field to expand the sleeve against the insulating layer of the die. There is provided an effective amount of energy to the metal member and transferred to the sleeve, preferably ranging from about 40 to about 80 kilojoules ("kj"), and more preferably ranging from about 50 to about 70 kj. During magnaforming, effective pressures are produced by the magnetic field and applied to the sleeve, preferably up to about 50,000 pounds per square inch ("psi"), more preferably about 5,000 to about 20,000 psi, and especially about 10,000 psi. Magnetic field generating systems and components thereof are available for example from Maxwell Laboratories, Inc., San Diego, Calif.

One final step in the sizing process in embodiments is the removal of the sized sleeve from the die. When the sleeve is sized, the sleeve will tightly expand against the inner surface of the die. When a seamless die is used, it is sometimes difficult to remove the sleeve from the die by simply pulling on one end of the sleeve. Therefore, the sleeve can be removed from the die by chilling the sleeve and the die where the sleeve shrinks more and faster than the die. For example, when chilled at the same temperature, aluminum, having a higher thermal coefficient of expansion, will shrink more and faster than steel. Thus, an aluminum sleeve can be removed from the steel die by inserting a cooling element inside the die. Any well known apparatus for chilling the sleeve and die can be used. For example, a cooling element containing dry ice may be inserted inside the sleeve to accomplish this step. When a split die is employed, the sized sleeve is removed by lifting off the top half of the die and then extracting the sleeve.

Other additional steps may also be performed. If an aluminum sleeve is desired to be sized, it is preferable that the aluminum sleeve is first softened prior to the insertion into the die to increase ductility. Heating the aluminum sleeve to approximately 950° F. for at least thirty minutes will soften the aluminum sleeve. The sleeve can then be annealed at high temperatures of for example about 100° to about 250° C. in a chemical solution after heating to further soften the sleeve. It is also preferable to harden the sized aluminum sleeve after removal from the die by heating the aluminum at 350° F. for approximately 8 hours.

The above process may also be used to size composite sleeves of two or more materials. For example, composite sleeves having layers of different materials may be formed. In fact, a composite sleeve having a core composed of an electrically conductive material can be formed with an outer layer of low conductivity material. In making photoreceptor substrates, it is sometimes desirable to provide a substrate having an inner layer composed of aluminum with a thin outer coating composed of nickel to provide sufficient hardness and a highly polished surface for the photoreceptor substrate. In this process, the above-described steps with regard to sizing sleeves of electrically conductive material are followed with the addition of inserting a sleeve of low conductivity material, such as nickel, into the die and then inserting a sleeve of electrically conductive material, such as aluminum, inside the nickel sleeve. When the magnetic field is generated, the resulting pressure will expand the aluminum sleeve against the inner surface of the nickel sleeve. Although nickel will not respond to the magnetic field, sufficient pressure will be generated to drive the aluminum sleeve against the nickel sleeve so that the nickel sleeve is further expanded against the inner surface of the die.

The invention will now be described in detail with respect to specific preferred embodiments thereof, it being understood that these examples are intended to be illustrative only and the invention is not intended to be limited to the materials, conditions or process parameters recited herein.

EXAMPLE 1

A sleeve to be sized is comprised of an aluminum sleeve having a length of 12 inches, an outside diameter of 1.5 inches, and a wall thickness of 0.020 inch. The sleeve is positioned in a cylindrical split die having a 0.5 inch thick ceramic lining covering the entire inner surface of the die. The inner diameter of the die, not including the ceramic lining, is 3 inches. A solid copper rod having a diameter of 1 inch and a length of 16 inches is provided with a 50 mils thick layer of Teflon TM, which covers the entire outer surface of the rod except for the electrically conductive interconnection piece coupled to one end of the rod. An end of the sleeve directly contacts the interconnection piece such that the copper rod and the sleeve are in direct electrical connection. The copper rod and the sleeve are coupled through a co-axial cable to an electrical generating device manufactured by Maxwell Industries, Inc. The rod is positioned within the sleeve such that the rod extends through the entire length of the sleeve. The electrical generating device charges and discharges a capacitor to supply about 50 to about 70 kJ of energy to the copper rod. The resulting magnetic field expands the sleeve against the ceramic lining of the die within 30 microseconds. The rod is removed from the sleeve and the upper half of the die is removed, thereby facilitating removal of the sleeve from the die. As a result, a photoreceptor substrate having an outside diameter of 2 inches is formed.

Other modifications of the present invention may occur to those skilled in the art based upon a reading of the present disclosure and these modifications are intended to be included within the scope of the present invention.

We claim:

1. A metal sizing method comprising:
   (a) providing an electrically conductive sleeve and a die, wherein the die has an inner surface at least partially covered by an electrically insulating layer wherein the extent of coverage of the insulating layer over the die inner surface and the thickness of the insulating layer are effective to prevent electrical shorting between the sleeve and the die;
   (b) positioning a portion of the sleeve in the die;
   (c) positioning a portion of an electrically conductive member inside the sleeve;
   (d) forming a direct electrical connection between the sleeve and the member; and
   (e) creating a magnetic field to expand the sleeve.

2. The method of claim 1, wherein (a) comprises providing the sleeve having an outside diameter prior to sizing of less than about 3 inches.

3. The method of claim 1, wherein (a) comprises providing that the insulating layer covers the entire inner surface of the die.

4. The method of claim 1, wherein (a) comprises providing that the insulating layer is at least about 40 mils thick.

5. The method of claim 1, wherein (a) comprises providing that the insulating layer has a thickness ranging from about 40 mils to about 1.5 inches.

6. The method of claim 1, wherein (c) occurs after (b).

7. The method of claim 1, wherein (c) comprises positioning the member comprised of a solid cylindrical rod inside the sleeve.

8. The method of claim 1, wherein (c) comprises positioning the portion of the member inside the sleeve at an effective distance from the inner surface of the sleeve to prevent electrical shorting therebetween.

9. The method of claim 8, wherein (c) accomplishes the positioning of the member inside the sleeve at an effective distance from the inner surface of the sleeve by providing a gap or a layer of an electrically insulating material between the member and the sleeve.

10. The method of claim 8, wherein (c) accomplishes the positioning of the member inside the sleeve at an effective distance from the inner surface of the sleeve by providing both a gap and a layer of an electrically insulating material between the member and the sleeve.

11. The method of claim 8, wherein (c) accomplishes the positioning of the member inside the sleeve at an effective distance from the inner surface of the sleeve by providing a layer of an electrically insulating material on the portion of the member positioned inside the sleeve.

12. The method of claim 8, wherein (c) comprises positioning the portion of the member inside the sleeve at a distance of at least about 40 mils between the member and the inner surface of the sleeve.

13. The method of claim 1, wherein (d) comprises contacting the sleeve with an electrically conductive piece which is coupled to the member.

14. The method of claim 1, wherein (e) comprises providing to the sleeve energy ranging from about 40 to about 80 kJ.

15. The method of claim 1, wherein (a) to (e) are accomplished sequentially.

16. A metal sizing apparatus comprising:
   (a) a die;
   (b) a portion of an electrically conductive sleeve disposed in the die;
   (c) a portion of an electrically conductive member disposed in the sleeve;
   (d) connecting means for providing a direct electrical connection between the sleeve and the member, wherein the connecting means is coupled to the member and the connecting means is in direct electrical contact with the sleeve; and
   (e) a layer of an electrically insulating material between the die and the sleeve.

17. The apparatus of claim 16, further comprising a gap, a layer of an electrically insulating material, or both the gap and the layer between the sleeve and the member.

18. The apparatus of claim 16, wherein the connecting means comprises an electrically conductive piece.

* * * * *